United States Patent [19]
Sowa et al.

[11] Patent Number: 5,865,701
[45] Date of Patent: Feb. 2, 1999

[54] HYDRAULICALLY-OPERABLE LOCKING DIFFERENTIAL INCLUDING ADJUSTABLE RETAINER RING DUCTING

[76] Inventors: Donald S. Sowa, 15578 Chestnut St., Roseville, Mich. 48066; Vincent C. Dettore, 2772 Harvey St., Rochester Hills, Mich. 48309

[21] Appl. No.: 769,367

[22] Filed: Dec. 19, 1996

[51] Int. Cl.[6] .................................................. F16H 48/30
[52] U.S. Cl. ............................................................. 475/86
[58] Field of Search ................................................ 475/86

[56] References Cited

U.S. PATENT DOCUMENTS

| | | | |
|---|---|---|---|
| 2,894,416 | 7/1959 | Scott | 475/86 |
| 2,991,664 | 7/1961 | Bernotas | 475/86 |
| 3,628,399 | 12/1971 | Seitz . | |
| 4,263,824 | 4/1981 | Mueller . | |
| 4,679,463 | 7/1987 | Ozaki et al. . | |
| 4,862,768 | 9/1989 | Iwatsuki, et al. | 475/86 |
| 4,966,249 | 10/1990 | Imaseki . | |
| 4,978,329 | 12/1990 | Yasui et al. . | |
| 5,125,876 | 6/1992 | Hirota . | |
| 5,133,696 | 7/1992 | Kobayashi . | |
| 5,520,589 | 5/1996 | Dewald, et al. | 475/86 |

*Primary Examiner*—Dirk Wright
*Attorney, Agent, or Firm*—Laubscher & Laubscher

[57] ABSTRACT

A hydraulically-operable locking differential includes a retainer ring that is threadably connected with the axle housing for adjustably supporting the bearings at one end of a differential casing, which retainer ring contains ducting for supplying pressure fluid to a hydraulic actuator contained within the casing, thereby to activate a friction pack assembly to lock a side gear of the differential to the differential casing. The ducting for the hydraulic fluid includes a first passage contained in the retainer ring, a second passage contained in and extending longitudinally of a tubular end portion of the casing, and a third passage which affords continuous communication between the first and second passages during rotation of the casing relative to the axle housing.

8 Claims, 4 Drawing Sheets

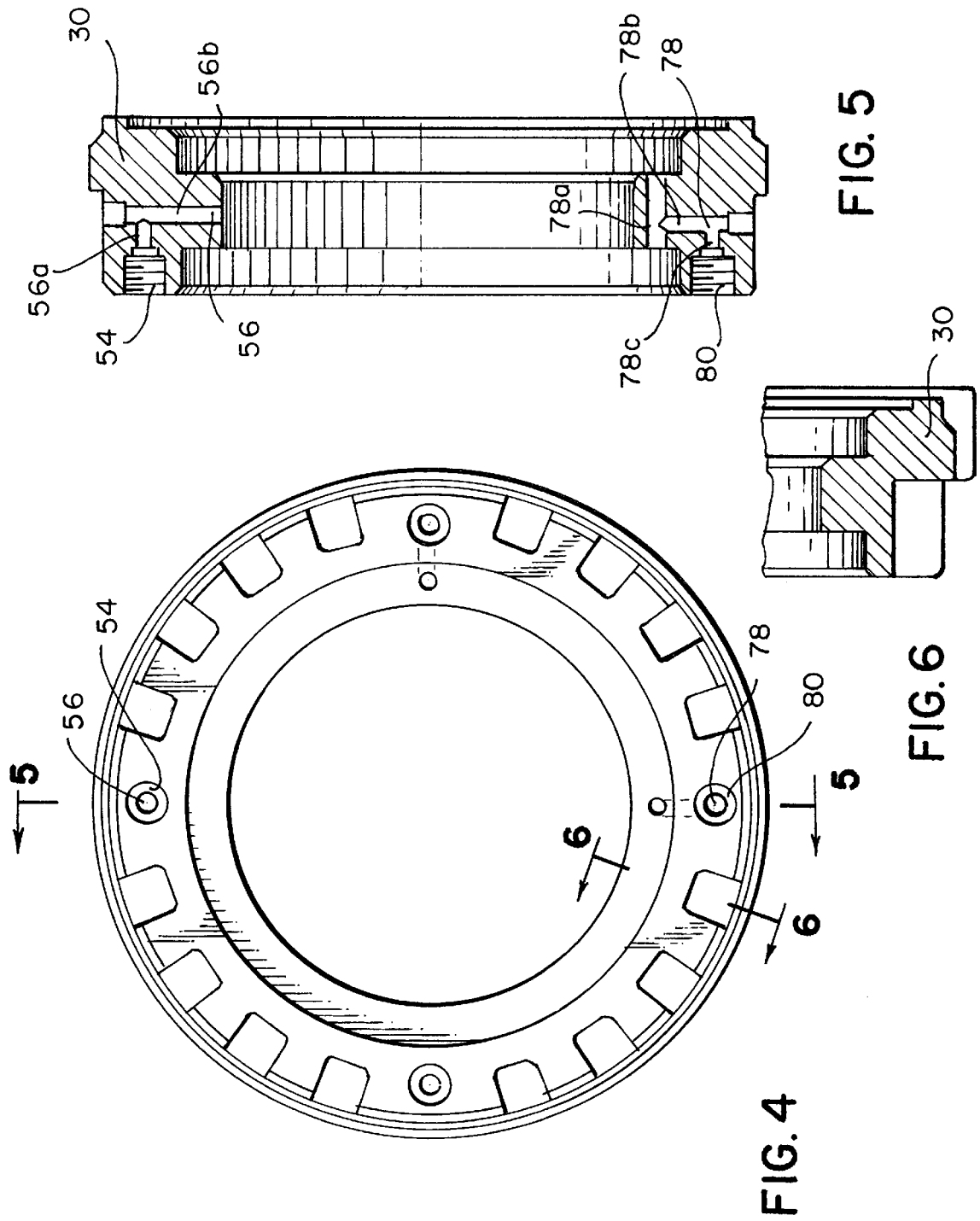

HYDRAULICALLY-OPERABLE LOCKING DIFFERENTIAL INCLUDING ADJUSTABLE RETAINER RING DUCTING

BACKGROUND OF THE INVENTION

1. Field of the Invention

An hydraulically-operable locking differential is disclosed including passage means contained within the casing adjustment ring for supplying pressure fluid to operate friction pack means to lock one side gear to the differential casing.

2. Brief Description of the Prior Art

It is well known in the patented prior art to include hydraulically operable friction pack means for connecting a side gear to the casing of a limited slip differential, as evidenced by the patents to Seitz et al U.S. Pat. No. 3,628,399, Mueller No. 4,263,824, Ozaki et al U.S. Pat. No. 4,679,463, Hirota U.S. Pat. No. 5,125,876 and Kobayashi U.S. Pat. No. 5,133,696, among others. In general, these systems are rather complex and expensive, and are not suitable for retrofit installation within a user's existing differential axle housing. One problem that occurs in such differentials is how to actuate hydraulically the friction pack means contained within the rotatably driven differential casing. The present invention was developed to provide an improved differential that avoids the above and other drawbacks of the known differential arrangements.

SUMMARY OF THE INVENTION

Accordingly, a primary object of the present invention is to provide an improved locking differential in which the pressure fluid for operating the friction pack means contained within the differential casing is supplied via a supply passage contained in the adjusting or retaining ring that supports the bearing means at one end of the casing within the associated output shaft opening contained in the differential axle housing.

According to a more specific object of the invention, the annular friction pack means is arranged concentrically within the casing chamber between the hub portion of one side gear and a cylindrical wall surface of the casing chamber, and the means for activating the friction pack means includes hydraulic actuator means arranged between one end of the friction pack means and an adjacent end wall of the casing chamber, pressure fluid being supplied to the hydraulic actuator means via a first passage contained in the adjustable retainer ring, a longitudinal second passage contained in the associated casing end portion and a third passage that affords continuous communication between the first and second passages during rotation of the casing relative to the axle housing. Preferably the third passage comprises a circumferential groove contained in the outer periphery of the casing end portion, seal means being provided for sealing the spaces between the casing end portion and the retaining ring on opposite sides of the groove.

Another object of the invention is to provide leakage collection chambers on opposite sides of the seal means, and fourth passage means contained in the retaining ring for connecting the leakage collection chambers with sump, thereby to avoid contamination of the oil within the axle by the high pressure fluid supplied to the hydraulic actuator means.

According to a more specific object of the invention, the differential casing is sectional and includes a center section and a pair of end sections, the hydraulic actuator including an annular cylinder formed in one end wall of the casing chamber carried by one casing, end section, the annular piston being mounted within the chamber. The piston reacts with an annular spring plate that is keyed for axial movement relative to the casing thereby to compress the annular friction pack assembly and to connect the associated side gear with the casing. Spring means are provided that normally bias the spring plate away from the friction pack assembly, whereby the friction pack means is normally in a deactivated condition.

BRIEF DESCRIPTION OF THE DRAWINGS

Other objects and advantages of the invention will become apparent from a study of the following specification when viewed in the light of the accompanying drawing, in which:

FIG. 4 is and end view of the adjustable retaining ring of FIG. 1;

FIGS. 5 and 6 are sectional views taken along lines 5—5 and 6—6, respectively, of FIG. 4;

DETAILED DESCRIPTION

Figure 1:
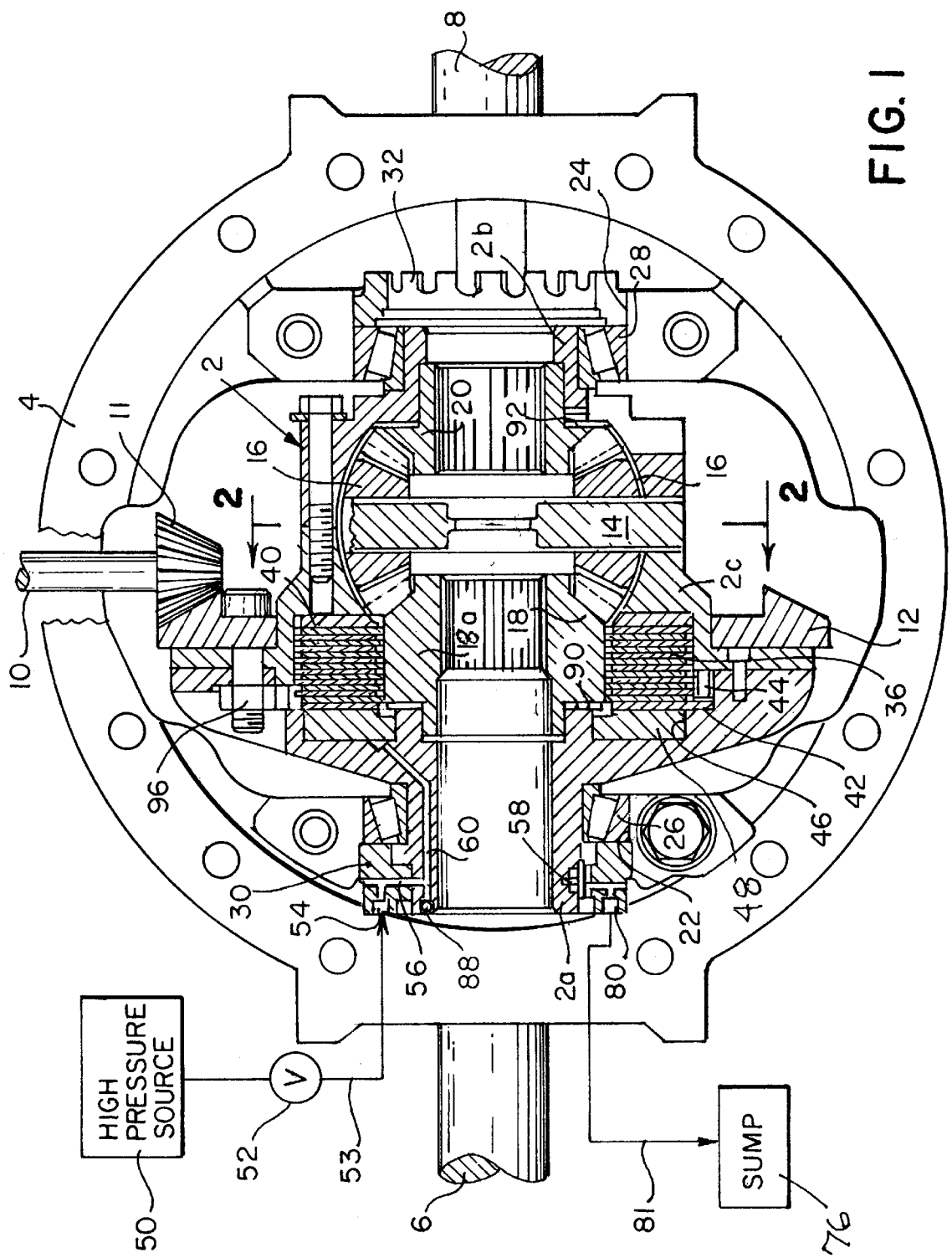
FIG. 1 is a longitudinal sectional view of the improved locking differential of the present invention taken along line 1—1 of FIG. 2.

Referring first more particularly to FIG. 1 the locking differential of the present invention includes a casing 2 that is mounted within a differential axle housing 4 for driving a pair of output shafts or axles 6 and 8 from drive shaft 10 via drive pinion 11, ring gear 12, casing 2, pinion shaft 14, pinions 16, and side gears 18 and 20 splined to the output shafts 6 and 8, respectively. The casing 2 is hollow and includes a pair of tubular end portions 2a and 2b that are rotatably supported within opposed axle openings 22 and 24 contained in the axle housing by bearing means 26 and 28, respectively. In accordance with a characterizing feature of the present invention, bearing means 26 is maintained in place relative to side gear 18 by annular adjustable retaining ring 30 that is threadably connected at its outer circumference with axle housing opening 22, and the other bearing means 28 is maintained in place by a conventional lock nut 32. It will be apparent that when lock nut 32 is loosened relative to bearing means 28, the casing may be axially displaced by rotation of the adjustable retainer to effect accurate engagement of ring gear 12 with drive pinion 11, whereupon lock nut 32 is tightened to rigidly maintain the casing against axial displacement relative to the axle housing 4.

Figure 7:
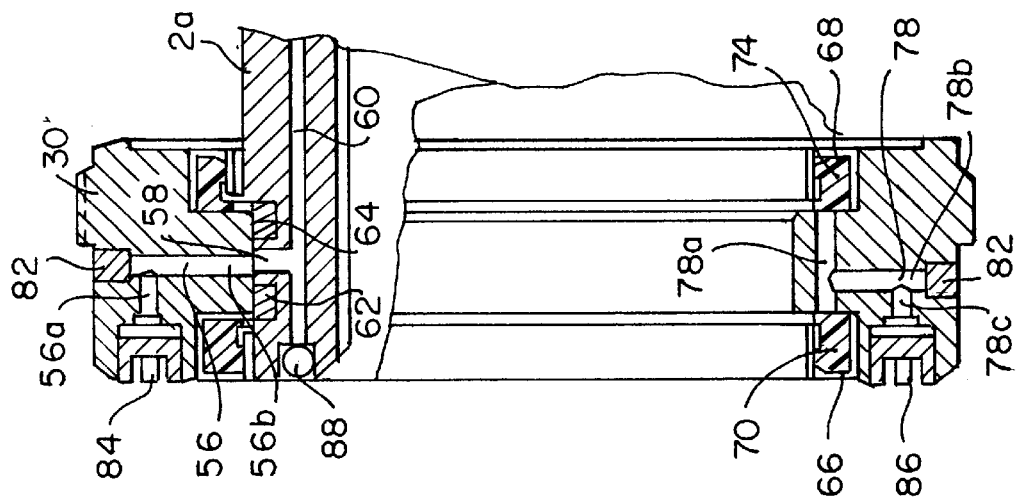
FIG. 7 is a partially assembled view of the retainer ring and lip seals as initially provided to the customer.
Figure 2:
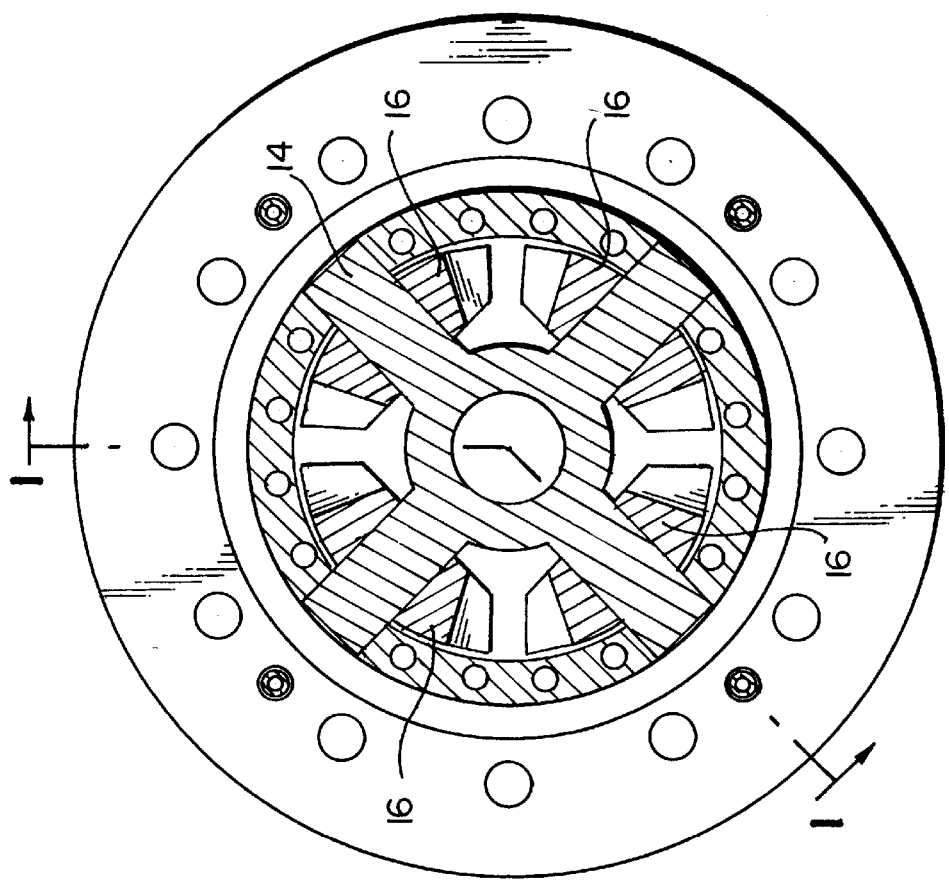
FIG. 2 is a sectional view taken along line 2—2 of FIG. 1.
Figure 8:
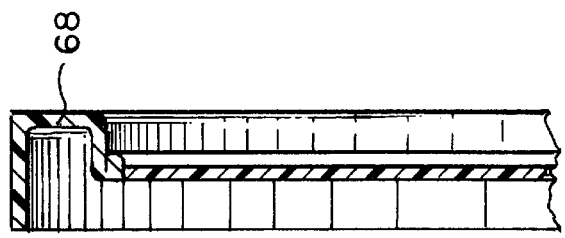
FIG. 8 is a detailed sectional view of one of the lip seals of FIG. 1.

Side gear 18 has a tubular hub portion 18a about which is concentrically mounted an annular friction pack assembly 36 including a stack of alternately arranged friction plates and reaction plates that are splined for axial displacement relative to said side gear and a cylindrical side wall portion of the casing chamber, respectively. The right hand end of the friction pack assembly engages an annular backing plate 40, and the left hand end of the assembly is engaged by annular spring plate 42 that is keyed for non-rotatable axial sliding displacement relative to the casing 2. Helical spring means 44 arranged between the friction plate and the casino bias the spring plate to the left to normally cause said friction pack means to be in a deactivated condition, whereby the side gear 18 is free for rotation relative to the casing 2. In order to axially compress the friction pack assembly and thereby lock the side gear 18 with the casing 2, hydraulic actuator means are provided including an annular cylinder 46 is formed in the casing chamber end wall for receiving the annular piston 48 that reacts with the spring plate 42. High pressure hydraulic fluid from source 50 is supplied (at a pressure of about 600 to 700 psi) to the working chamber of the hydraulic actuator via manually operable valve means 52, conduit 53, retaining ring inlet opening 54, first passage means 56 contained in the retaining ring, an annular groove 58 contained in the outer circumference of the casing end portion 2a, and a second passage 60 that extends longitudinally of the casing first end portion 2a. As best shown in FIGS. 5 and 7, the first passage 56 in the retaining ring includes a longitudinal first portion 56a that extends axially of the ring, and a second portion 56b that extends radially inwardly toward groove 58. Annular groove 58 defines third passage mean that continuously connects first passage means 56 with second passage means 60. Split cast iron seal rings 62 and 64 provide seals in the space between the casing end portion 2a and the inner circumference of the retaining ring on opposite sides of the groove 58, and resilient lip seals 66 and 68 (such as Chicago Rawhide lip seals Nos. 32330 and 31135) mounted in corresponding counter bores contained in the retaining ring 30 define leakage capture chambers 70 and 74, respectively, for returning any leaked hydraulic fluid back to sump 76 via fourth passage 78, discharge opening 80, and conduit 81. Fourth passage 78 includes a longitudinally extending through bore portion 78a. a radially outwardly directed portion 78b, and a longitudinally extending portion 78c that communicates with outlet 80. As shown in FIG. 7, the remote ends of the passage portions 56b and 78b are permanently plugged by plugs 82, and the inlet and outlet openings 54 and 80 are initially closed by removable screw plugs 84 and 86, respectively. The free end of the bore 60 adjacent the retaining ring is permanently plugged by the plug 88, as shown in FIG. 7.

Figure 3:
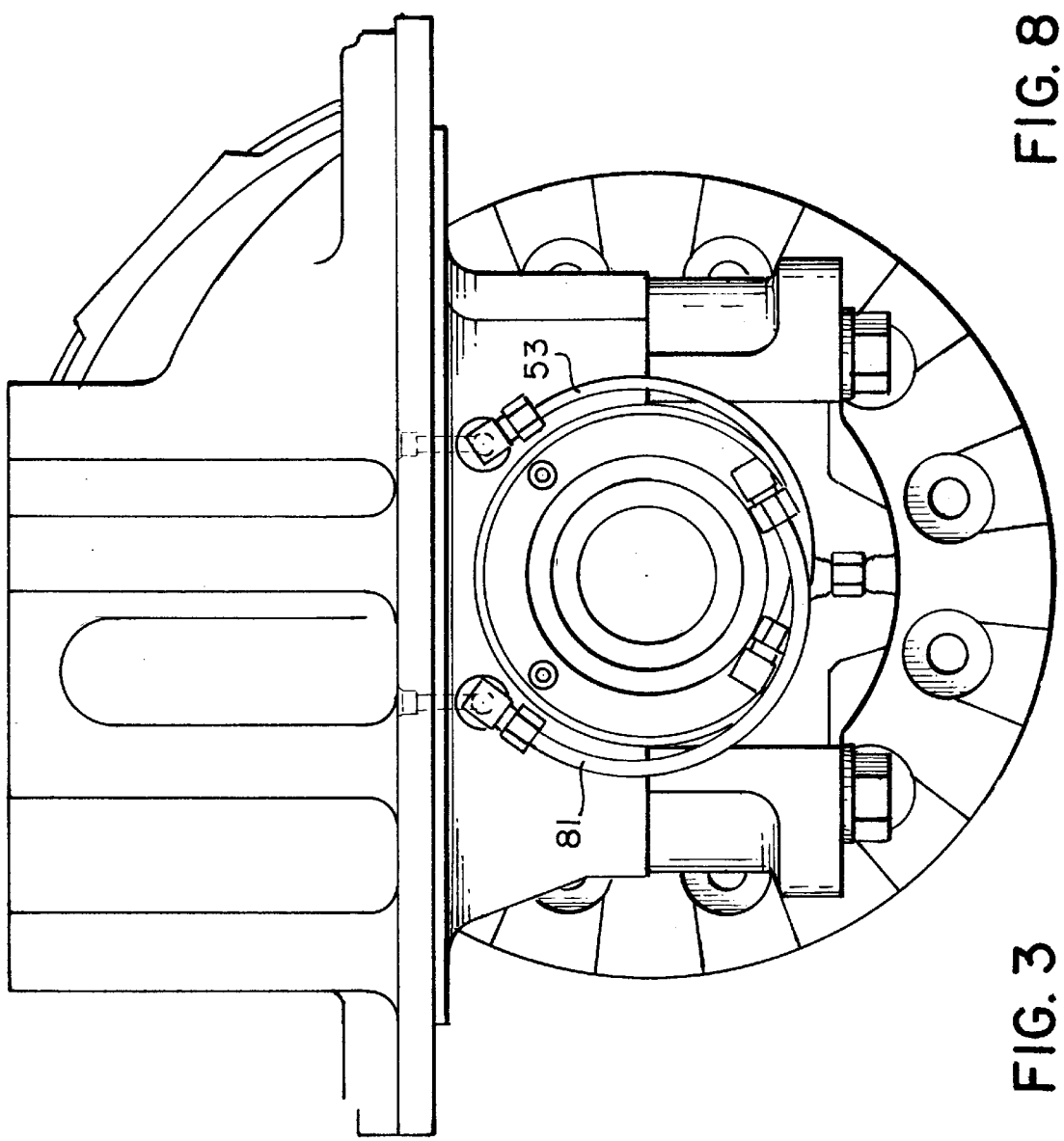
FIG. 3 is a left-hand end view of the differential of FIG. 1.

Referring to FIG. 3, it will be seen that initially all four of the inlet and outlet ports of the retaining ring are closed by two sets of the removable plugs 84 and 86, of FIG. 7, whereupon after the ring gear adjustment has been made by the appropriate rotatable adjustment of the retaining ring 30, the most convenient inlet and outlet plugs are removed to permit connection of the synthetic plastic high pressure inlet and outlet lines 53 and 81, respectively.

For ease of manufacture, the casing 2 is sectional and includes a center section 2c, and a pair of end sections containing the end portions 2a and 2b, respectively, the sections being bolted together. To improve the operation and the life of the differential thrust washers 90 and 92 are provided between the side gears and the associated casing chamber walls.

According to the advantages afforded by the present invention, the improved hydraulic transfer system allows the hydraulic fluid to be transferred from outside the fixed axle housing into the rotating differential to actuate the friction pack assembly. The standard lip seals are used to retain and recycle the hydraulic fluid without contamination of the lubricating oil contained within the axle housing. A lubrication opening 96 may be defined between the casing center and First end sections to permit entry of the lubricating oil from the axle housing into the friction pack assembly. The use of the synthetic plastic high pressure tubing permits connection of the hydraulic fluid supply and return conduits after the ring gear adjustment without the use of special tools or limitations because of port location. The built-in capture system diverts leakage of the hydraulic fluid from the rotary seal means back into sump, and the size of the orifice porting may be used to control the reaction time of lock-up. The improved design allows for full lock up and is caused to slip just prior to axle shaft breakage due to torque overload. Furthermore, the design allows for retrofit insertion into an existing carrier housing with minimal modification. Finally, by varying the hydraulic pressure, this improved design can be used for a full lock up or use as a limited torque proportional differential.

While in accordance with the Patent Statutes the preferred forms and embodiments of the invention have been disclosed and described, it will be apparent that changes may be made without deviating from the invention set forth in the accompanying claims.

What is claimed is:

1. A locking differential for driving a pair of axially aligned output shafts from a rotatably driven drive shaft, said differential being adapted for insertion within a hollow differential axle housing containing a pair or aligned output shaft openings, comprising:

(a) a hollow differential casing containing a chamber and having a pair of tubular end portions containing opposed output shaft openings defining an axis of rotation for said casing relative to said axle housing;

(b) support means for rotatably supporting said casing end portions within the axle housing output shaft openings, respectively, each of said support means including:

(1) an annular bearing assembly arranged concentrically about the associated casing end portion, said bearing assembly including annular concentrically arranged inner and outer races, and a plurality of bearing members arranged between said races; and (2) stationary retaining means adapted for threaded connection within the associated housing output shaft opening to support said bearing assembly relative to an associated first casing end portion, including a stationary annular retaining ring arranged concentrically about said casing first end portion, said retaining ring being externally threaded for connection with the differential housing;

(c) a pair of annular side gears arranged adjacent and collinear with said casing output shaft openings, respectively, said side gears being adapted for concentric non-rotatable mounting on the output shafts, respectively;

(d) spider and pinion gear means connecting said side gears for differential movement relative to each other and to said casing; and (e) means for releasably locking a first one of said side gears with said casing, including:

(1) annular friction pack means arranged concentrically between said first side gear and a cylindrical side wall portion of said casing chamber, said friction pack means including a plurality of alternately arranged annular friction plates and reaction plates connected for axial sliding movement relative to said first side gear and to said casing chamber cylindrical side wall portion, respectively, said friction pack means being normally deactivated to permit free rotation of said side gears relative to said casing; and (2) normally deactivated hydraulic motor means operable to activate said friction pack means to connect said first side gear with said casing, said hydraulic motor means including:

(a) an annular hydraulic motor arranged within said casing concentrically about said axis of rotation intermediate said friction pack means and a first end wall of said casing chamber; and (b) means for supplying pressure fluid to said hydraulic motor from a pressure fluid source external of said casing, including:

(1) first passage means contained in said annular retaining ring;

(2) second passage means contained in and extending longitudinally of said first casing end portion; and (3) third passage means affording continuous communication between said first and second passage means during rotation of said casing relative to said retaining ring, said third passage means comprising a circumferential groove formed in the outer circumference of said first casing end portion, said first passage means including a radially inwardly directed portion that terminates opposite said groove, and said second passage means including a portion that extends from said groove longitudinally of said first casing end portion toward said hydraulic actuator; and (f) means for sealing said groove from the interior of the differential axle housing, including:

(1) a pair of annular rotary real means (62, 64) arranged concentrically between said casing end portion and said retaining ring on opposite sides of said groove, respectively; and (2) lip seal means defining a pair of annular leakage capture chambers (70, 74) arranged concentrically between said retaining ring and said first casing end portion on opposite sides of said rotary seal means, said retaining ring containing fourth passage means (78) for connecting said leakage capture chambers with sump.

2. Apparatus as defined in claim 1, wherein said hydraulic actuator comprises an annular cylinder defined by an annular groove contained in said first casing chamber end wall, and an annular piston contained within said annular cylinder, said third passage means being in communication with said annular cylinder.

3. Apparatus as defined in claim 2, and further including an annular spring plate arranged between said piston and the adjacent first end of said friction pack means, and spring means biasing said spring plate away from said friction pack means, thereby to normally deactivate the same.

4. Apparatus as defined in claim 3, wherein said spring plate is keyed with said casing for non-rotational axial displacement relative thereto.

5. Apparatus as defined in claim 4, and further including an annular backing plate arranged between the remote second end of said friction pack means and a corresponding opposed second end wall of said casing chamber.

6. Apparatus as defined in claim 5, wherein said casing is sectional and includes a center section, and first and second end sections carrying said first and second end portions, respectively, said first and second chamber end walls being carried by said first and center casing sections, respectively.

7. Apparatus as defined in claim 2, and further wherein said casing chamber cylindrical wall portion contains oil port means affording communication between said chamber and the interior of the axle housing, thereby to afford lubrication to said friction pack means.

8. Apparatus as defined in claim 1, wherein said casing includes between said first and second end portions an annular flange portion adapted for connection with a ring gear associated with a drive pinion on the drive shaft, said retaining member being rotatable relative to the axle housing to displace said casing axially relative to the axle housing, thereby to adjust the position of the ring gear relative to the drive pinion; and further wherein a second retaining means associated with the second end of the casing comprises an externally threaded lock nut adapted for threaded engagement with the associated axle housing opening, thereby to lock said casing in position relative to the axle housing.

* * * * *